(12) United States Patent
Sheahan et al.

(10) Patent No.: US 7,690,467 B2
(45) Date of Patent: Apr. 6, 2010

(54) MOTORCYCLE FRAME WITH FUEL-STORAGE AND BREAK-AWAY ENGINE MOUNTS

(75) Inventors: Matthew J. Sheahan, Milwaukee, WI (US); Chad E. Antczak, Waukesha, WI (US)

(73) Assignee: Buell Motorcycle Company, East Troy, WI (US)

( * ) Notice: Subject to any disclaimer, the term of this patent is extended or adjusted under 35 U.S.C. 154(b) by 226 days.

(21) Appl. No.: 11/772,375

(22) Filed: Jul. 2, 2007

(65) Prior Publication Data

US 2009/0008177 A1 Jan. 8, 2009

(51) Int. Cl.
*B62K 11/08* (2006.01)
(52) U.S. Cl. ...................... 180/232; 280/225
(58) Field of Classification Search ................. 180/219, 180/225, 228, 232
See application file for complete search history.

(56) References Cited

U.S. PATENT DOCUMENTS

| 4,170,272 | A | * | 10/1979 | Smolinski | 180/227 |
|---|---|---|---|---|---|
| 4,461,489 | A | | 7/1984 | Tsukiji et al. | |
| 4,678,054 | A | * | 7/1987 | Honda et al. | 180/225 |
| 4,951,774 | A | | 8/1990 | Buell | |
| 5,390,758 | A | * | 2/1995 | Hunter et al. | 180/228 |
| 5,876,013 | A | * | 3/1999 | Ott | 248/674 |
| 6,024,185 | A | * | 2/2000 | Okada et al. | 180/227 |
| 6,186,550 | B1 | * | 2/2001 | Horii et al. | 280/833 |
| 6,484,837 | B1 | | 11/2002 | Buell et al. | |
| 6,823,960 | B2 | * | 11/2004 | Shimizu et al. | 180/292 |
| 7,383,909 | B2 | * | 6/2008 | Kawase | 180/219 |

FOREIGN PATENT DOCUMENTS

JP 02085082 A * 3/1990

* cited by examiner

*Primary Examiner*—Kevin Hurley
(74) *Attorney, Agent, or Firm*—Michael Best & Friedrich LLP

(57) ABSTRACT

A motorcycle frame includes hollow left and right frame members that define a fuel-containing volume. Left-center, right-center, left-rear, and right-rear engine supports each depend from a corresponding left and right frame member. Each engine support includes a first portion that is coupled to the frame member and a second portion that is coupled to the engine. Each engine support also includes a stress riser defined between the first and second portions. The stress riser is configured to cause the first and second portions to separate from one another in response to application of sufficient force to the engine or second portion. By causing the first and second portions of the engine mount to separate in a predetermined way, the frame members and the fuel-containing volume are left intact.

22 Claims, 9 Drawing Sheets

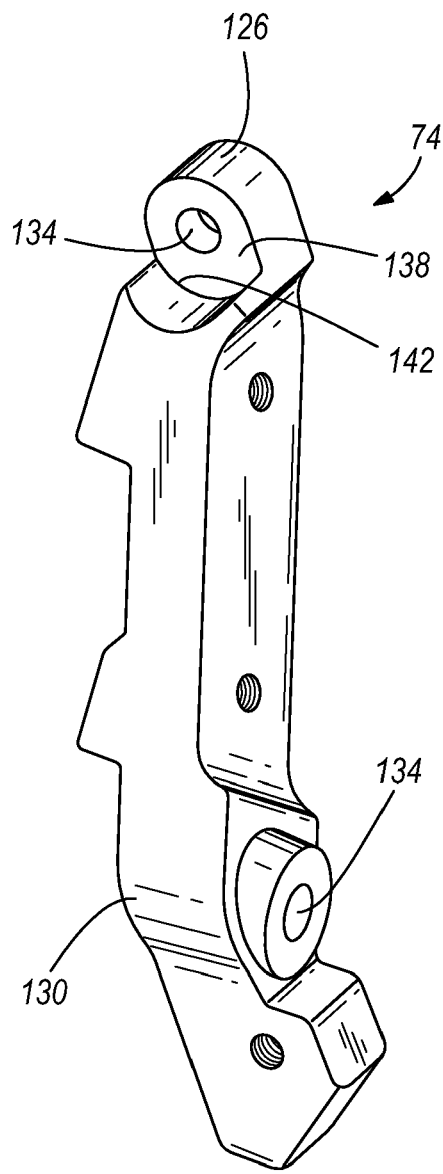
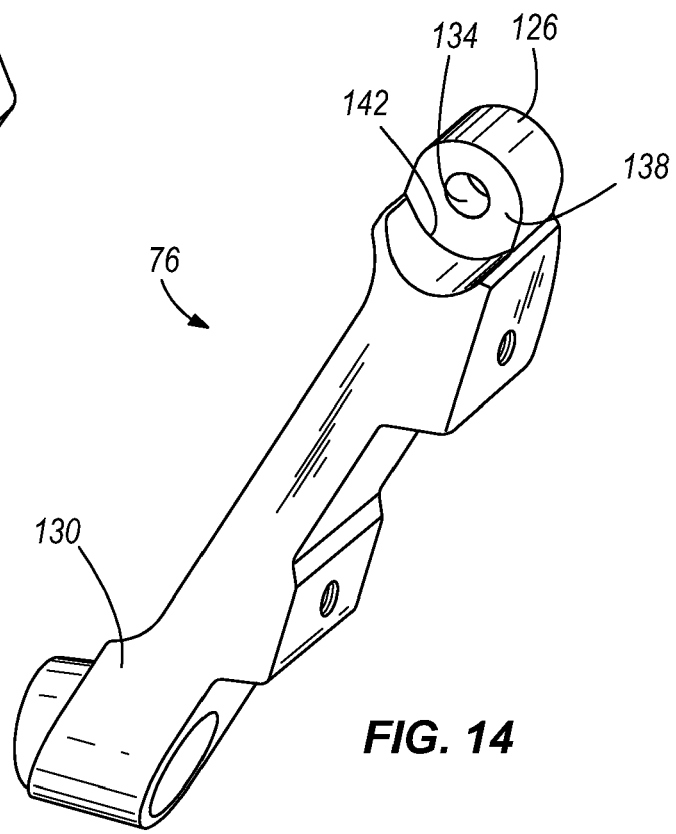
FIG. 13
FIG. 14

MOTORCYCLE FRAME WITH FUEL-STORAGE AND BREAK-AWAY ENGINE MOUNTS

BACKGROUND

The invention relates to a motorcycle frame that defines a fuel storage chamber and includes break-away engine mounts.

Most motorcycles include a frame that supports or interconnects other motorcycle components. Examples of components that are often coupled to the motorcycle frame include a steering assembly and front wheel, an engine, a fuel tank, a rider support assembly, and a swingarm and rear wheel assembly. Known frame designs include twin-spar designs having side beams that extend along sides of the engine from a steering head to a swingarm pivot, trellis frames formed of triangulated sections of tubing extending along the sides of the engine, and cradle frames formed of combinations of tubing, castings, and/or forgings.

SUMMARY

Some embodiments of the invention provide a motorcycle frame for supporting a motorcycle engine. The frame includes a hollow frame member defining a fuel-containing volume, and an engine support extending from the frame member. The engine support defines an engine mount and stress focusing structure defined between the engine mount and the frame member. The stress focusing structure defines a failure path such that when a force sufficient to initiate failure along the failure path is applied to the engine mount, the engine support separates from the frame member while leaving the fuel-containing volume substantially intact.

Other embodiments of the invention provide a motorcycle frame for supporting a motorcycle engine. The motorcycle frame includes a steering head and at least one hollow frame member that extends from the steering head and defines a fuel-containing volume. The frame also includes an engine support that depends from the hollow frame member and that defines a stress focusing edge. The stress focusing edge defines a failure path that substantially divides the engine support into a first portion adjacent the hollow frame member, and a second portion. If a force is applied to the second portion having sufficient magnitude to at least partially separate the second portion from the first portion, the first portion remains coupled to the hollow frame member, thereby leaving the hollow frame member and the fuel-containing volume substantially intact.

Still other embodiments of the invention provide a motorcycle including a frame, a steering assembly, a front wheel, an engine, a swingarm, a rear wheel, and an engine support. The frame includes a steering head and at least one hollow frame member defining a fuel containing volume. The steering assembly is pivotably coupled to the steering head, and the front wheel is in turn rotatably coupled to the steering assembly. The swingarm is pivotably coupled to one or both of the frame and the engine, and the rear wheel is rotatably coupled to the swingarm. The engine support couples the engine to the hollow frame member and includes a first portion extending from the hollow frame member, and a second portion coupled to the engine. A stress riser is defined between the first and second portions. The stress riser is configured such that when a force is applied to the second portion sufficient to cause at least partial separation of the second portion from the first portion, the hollow frame member and the fuel-containing volume remain substantially intact.

BRIEF DESCRIPTION OF THE DRAWINGS

FIG. 13 is a perspective view of the left-front engine mount bracket of FIG. 2.

FIG. 14 is a perspective view of the right-front engine mount bracket of FIG. 2.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
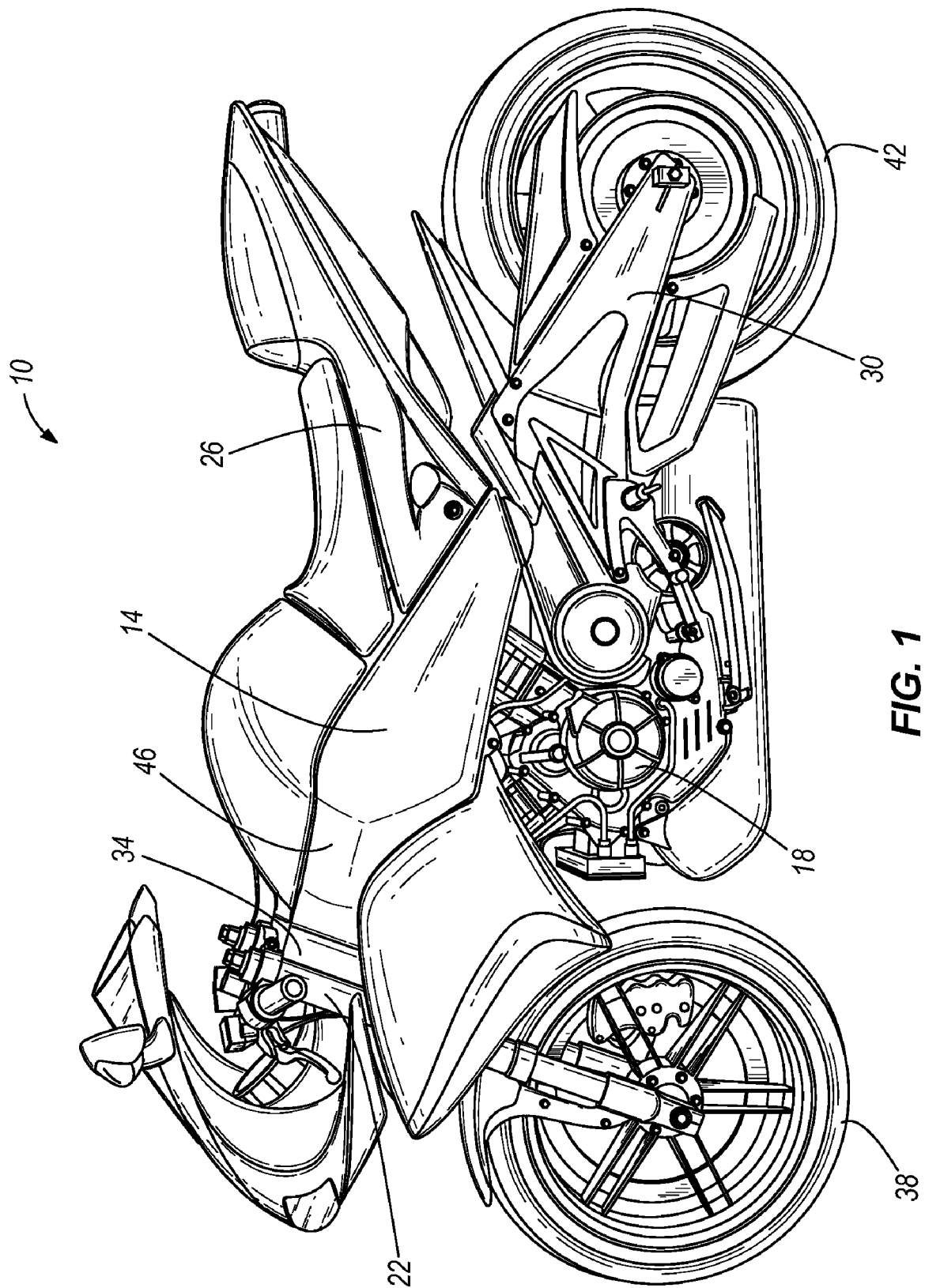
FIG. 1 is a side view of a motorcycle embodying the invention.

FIG. 1 illustrates a motorcycle 10 including a frame 14 that supports an engine assembly 18, a steering assembly 22, a rider support assembly 26, and a swingarm 30. The steering assembly 22 is pivotably coupled to a steering head portion 34 of the frame 14, and a front wheel 38 is in turn rotatably coupled to the steering assembly 22. The engine assembly 18 is coupled to the frame 14 in the manner discussed further below, and the swingarm 30 is pivotably coupled to the engine assembly 18. A rear wheel 42 is rotatably coupled to the swingarm 30. In other constructions, the swingarm 30 may be pivotably coupled to the frame 14, or may be pivotably coupled to both the frame 14 and the engine assembly 18.

Figure 2:
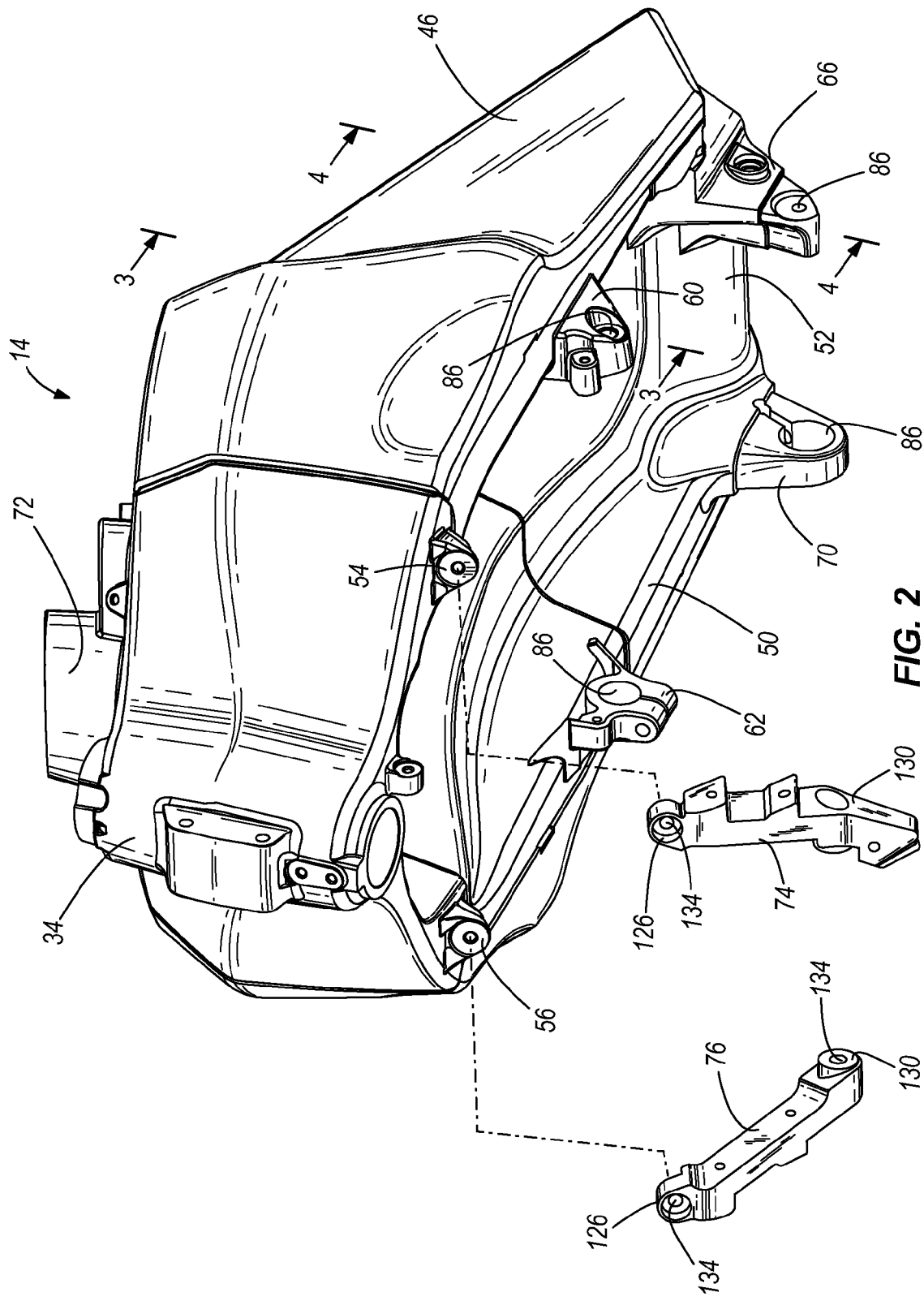
FIG. 2 is a perspective view of a frame for the motorcycle of FIG. 1 showing left-front and right-front engine mount brackets exploded away from the frame.

Referring also to FIG. 2, the frame 14 includes the steering head portion 34, a left frame member 46 extending rearwardly from the steering head portion 34, and a right frame member 50 also extending rearwardly from the steering head portion 34. A rear junction 52 extends between and couples together the left and right frame members 46, 50. A left-front engine support 54 and a right-front engine support 56 depend from the underside of the left and right frame members 46, 50, respectively, proximate the steering head portion 34. A left-center engine support 60 and a right-center engine support 62 depend from the left and right frame member 46, 50, respectively, approximately mid-way between the steering head portion 34 and the rear junction 52. A left-rear engine support 66 and a right-rear engine support 70 depend from the left and right frame member 46, 50, respectively, substantially adjacent the rear junction 52.

The frame 14 also defines a fuel inlet 72 that allows fuel to be dispensed into the frame 14 as discussed further below. A left-front engine mount bracket 74 is coupled to the left-front engine support 54 and a right-front engine mount bracket 76 is coupled to the right-front engine support 58. The left-front and right-front engine mount brackets 74, 76 extend generally downwardly for coupling with the engine assembly 18 and other components of the motorcycle 10.

Figure 3:
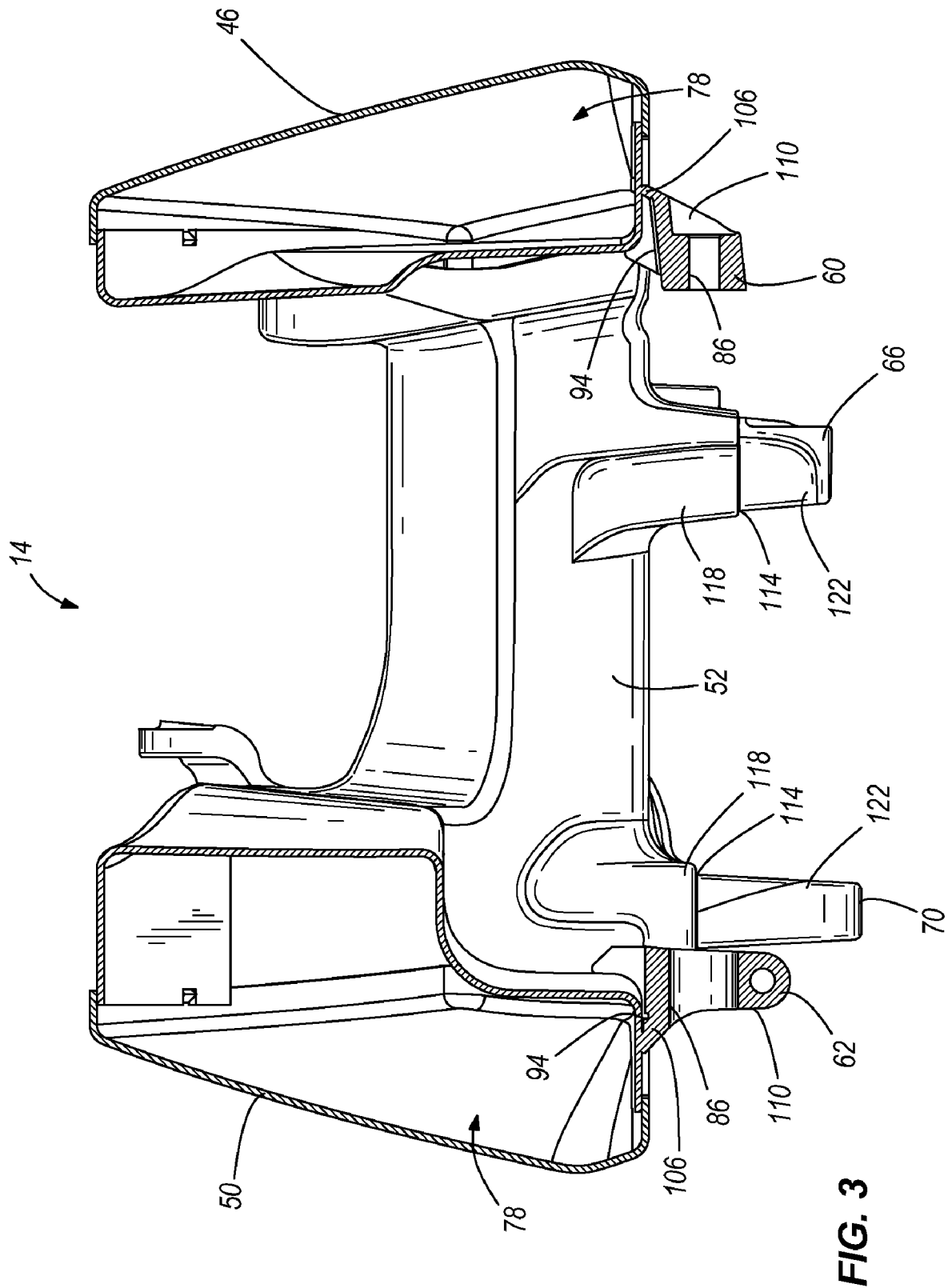
FIG. 3 is a section view taken along line 3-3 of FIG. 2.
Figure 4:
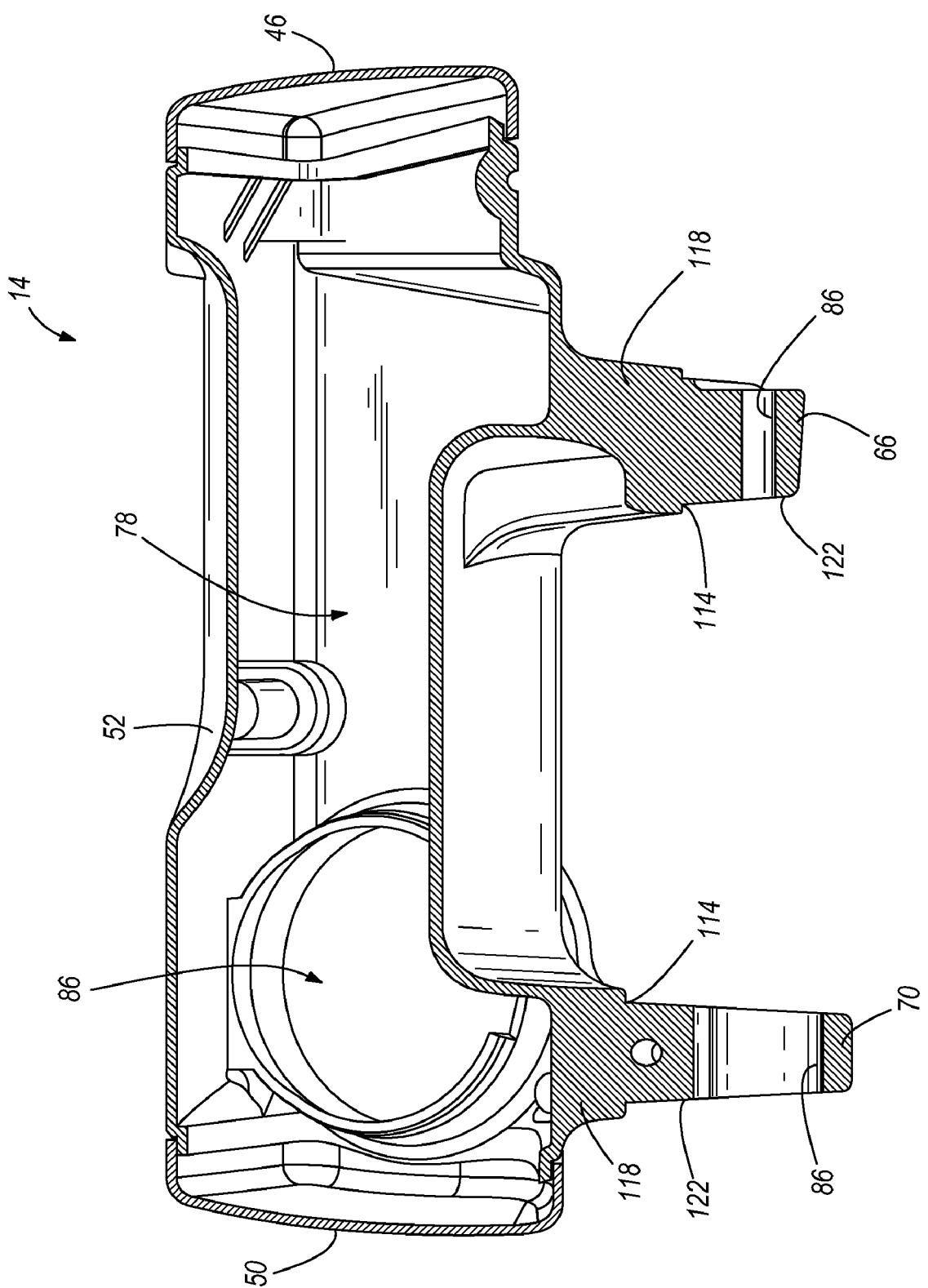
FIG. 4 is a section view taken along line 4-4 of FIG. 2.
Figure 5:
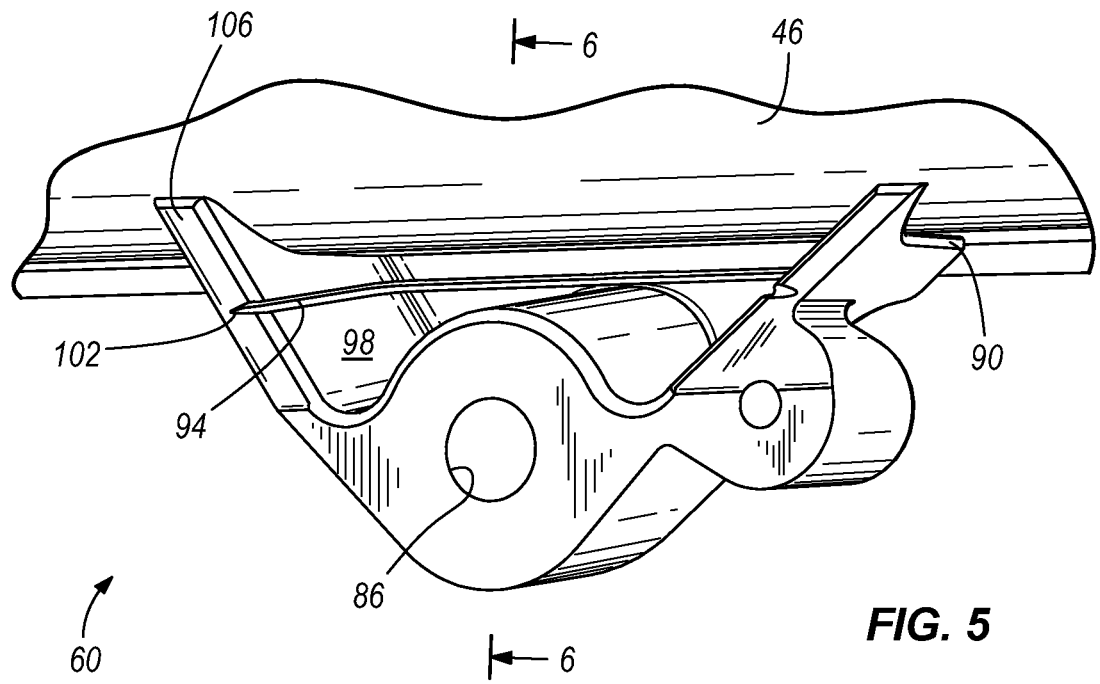
FIG. 5 is a perspective view of a left-center engine support of the frame of FIG. 2.
Figure 6:
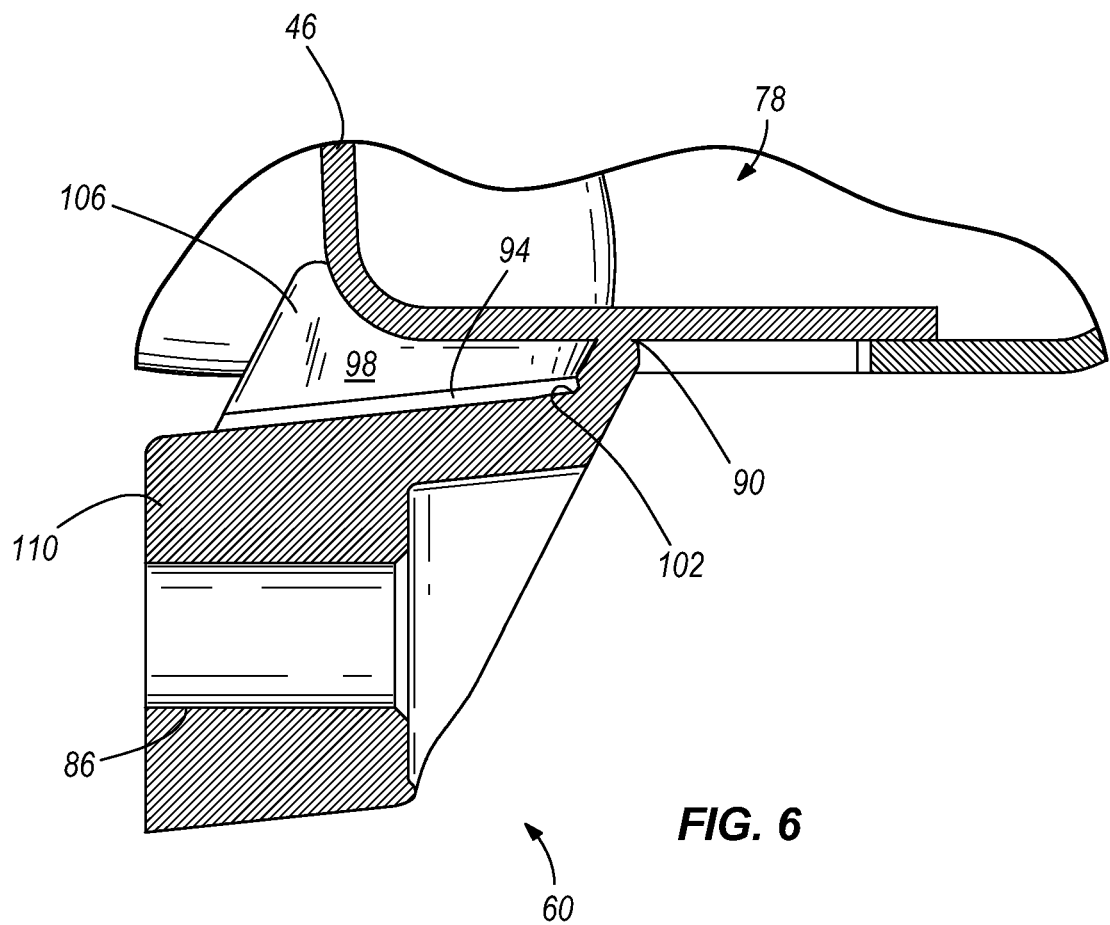
FIG. 6 is a section view taken along line 6-6 of FIG. 5.

Referring also to FIGS. 3 and 4, the left and right frame members 46, 50 are hollow and cooperate with the rear junction 52, which is also hollow (FIG. 4), to define a fuel-containing volume 78. Liquid fuel is introduced into the fuel-containing volume 78 by way of the fuel inlet 74 (FIG. 2) and is stored within the left and right frame members 46, 50, and the rear junction 52 for use by the engine assembly 18. The rear junction 52 defines an outlet opening 82 that, in some constructions, receives a fuel pump assembly (not shown) which draws fuel from the fuel-containing volume 78 and supplies the fuel to the engine assembly 18.

Each center and rear engine support 60, 62, 66, and 70 defines an engine mount 86 which, in the illustrated construction, is in the form of a cylindrical aperture extending through the respective engine support 60, 62, 66, 70. The illustrated engine mounts 86 are configured to receive one or more of an engine-mounting sleeve, cylinder, and fastener (not shown) for rigidly coupling the engine assembly 18 to the frame 14. Other types, styles, and configurations of engine mounts 86 may be defined or otherwise provided by or on the engine supports 60, 62, 66, 70.

Figure 7:
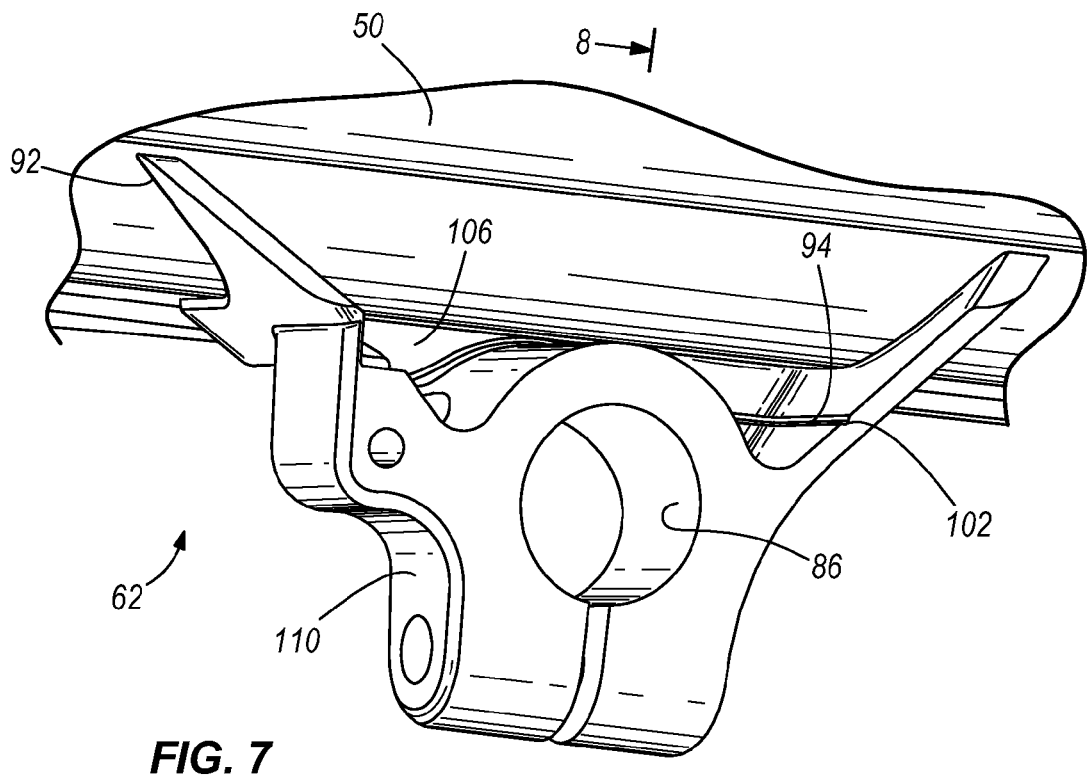
FIG. 7 is a perspective view of a right-center engine support of the frame of FIG. 2.
Figure 8:
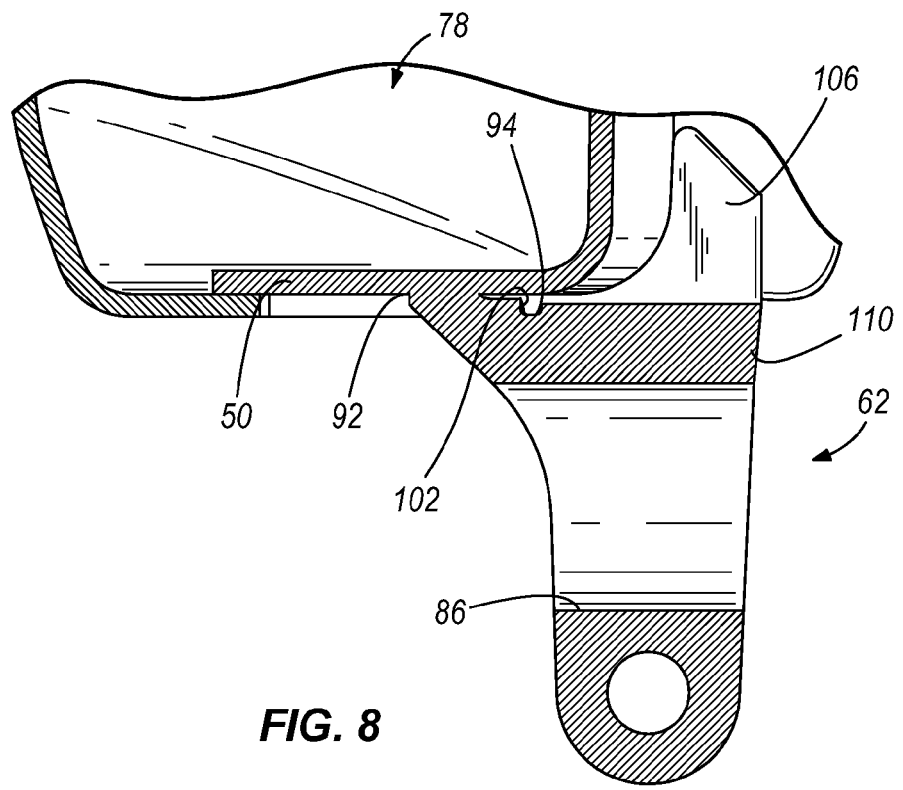
FIG. 8 is a section view taken along line 8-8 of FIG. 7.
Figure 9:
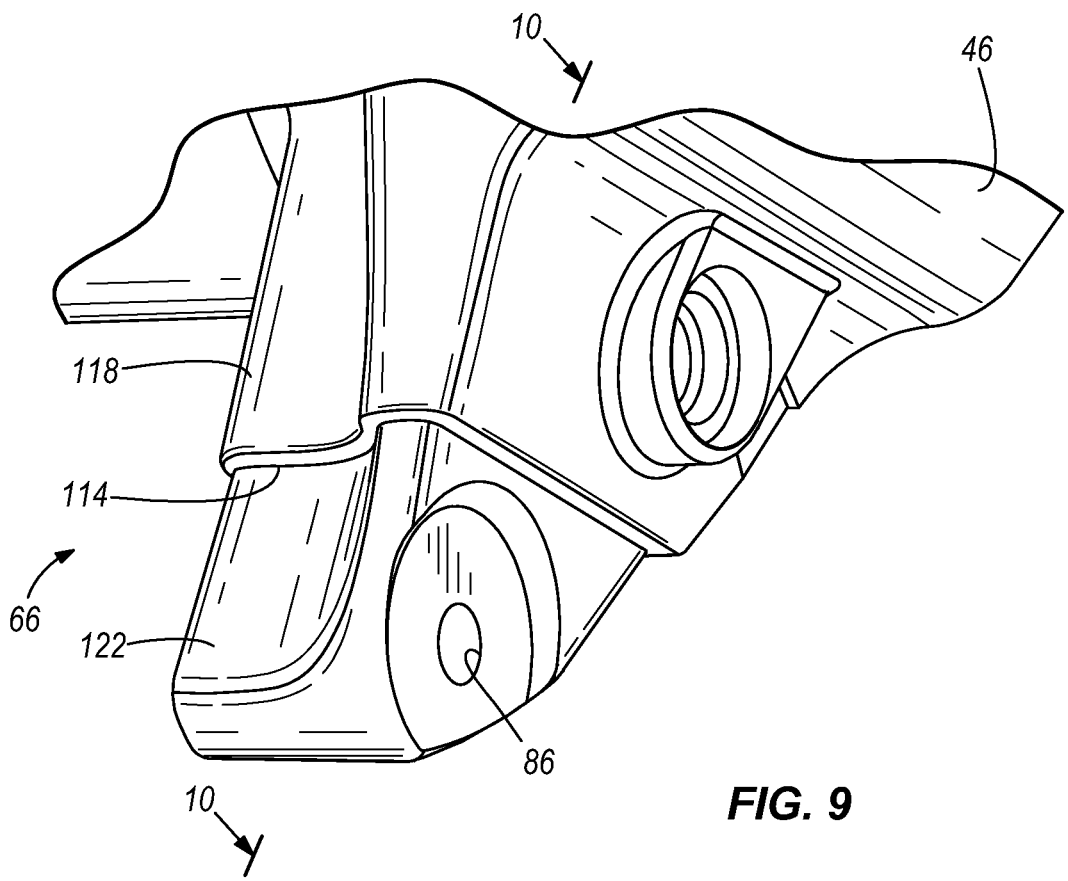
FIG. 9 is a perspective view of a left-rear engine support of the frame of FIG. 2.
Figure 10:
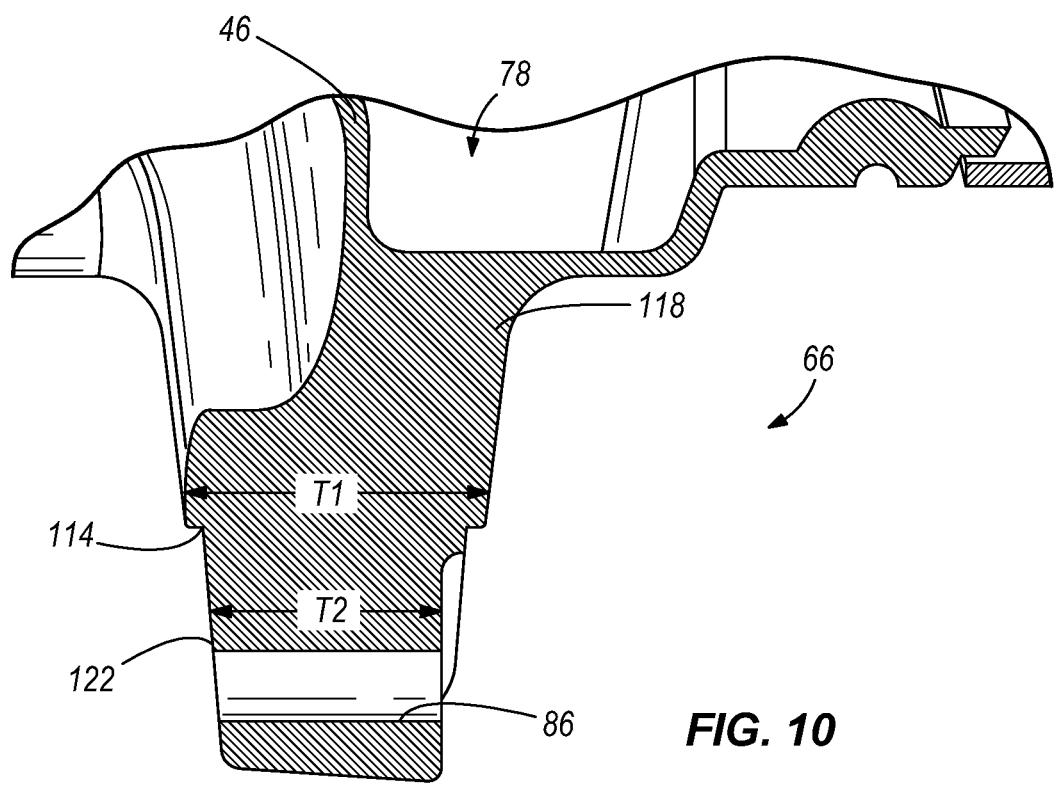
FIG. 10 is a section view taken along line 10-10 of FIG. 9.
Figure 11:
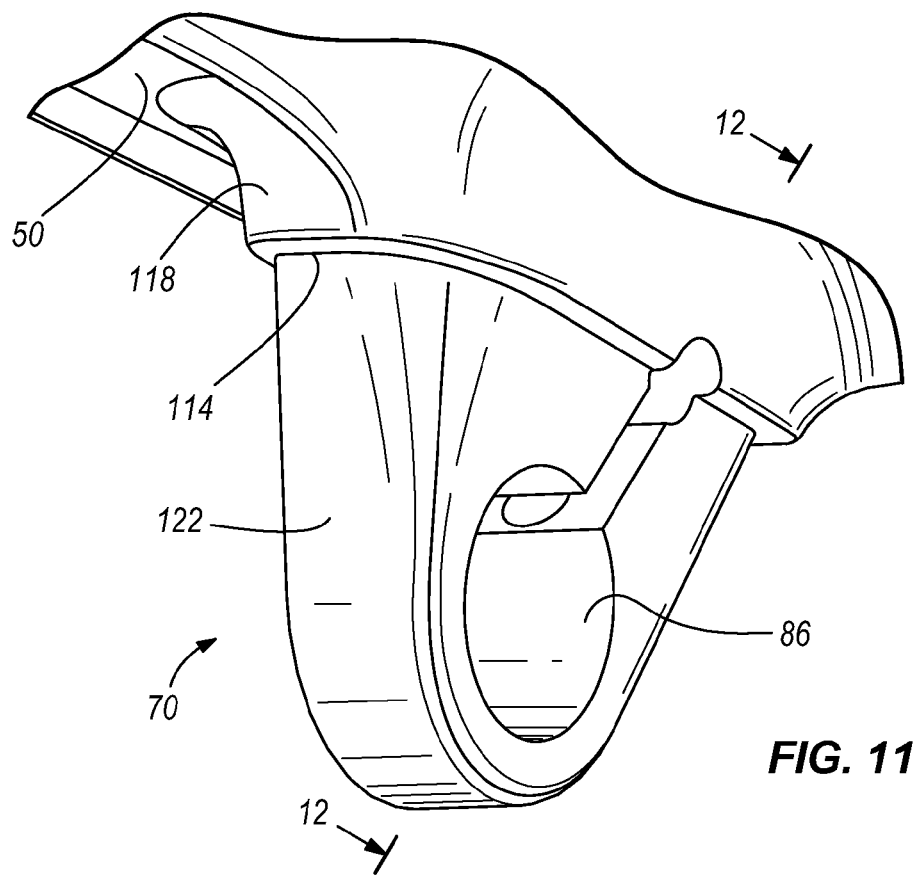
FIG. 11 is a perspective view of a right-rear engine support of the frame of FIG. 2.
Figure 12:
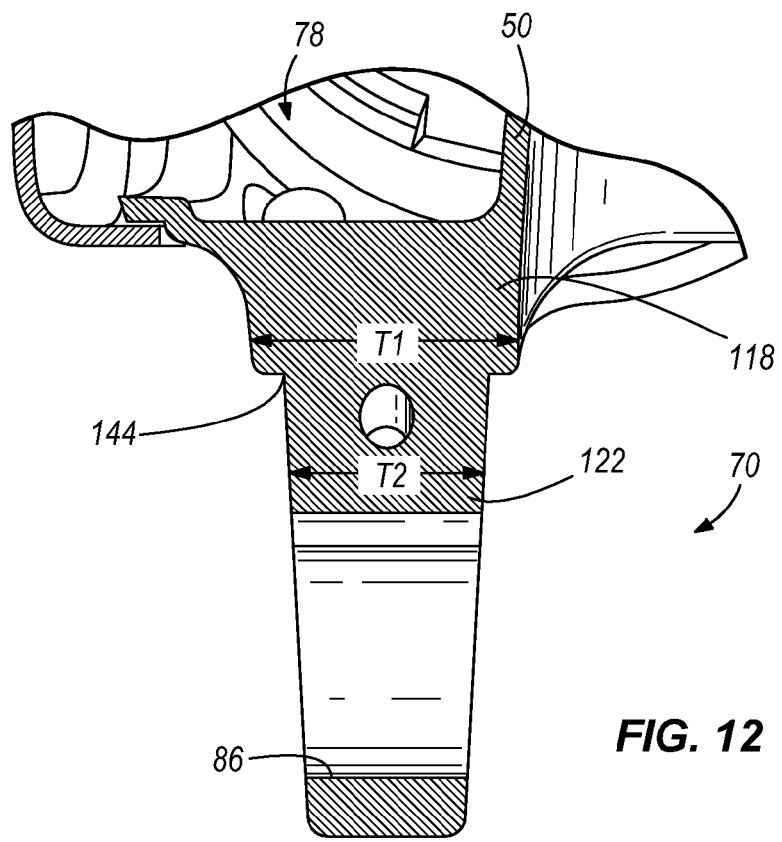
FIG. 12 is a section view taken along line 12-12 of FIG. 11.

FIGS. 5-8 illustrate the left-center engine support 60 (FIGS. 5 and 6) and the right-center engine support 62 (FIGS. 7 and 8). The left-center engine support 60 is coupled to the left frame member 46 by welding along an outer edge 90 of the left-center engine support 60. Similarly, the right-center engine support 62 is coupled to the right frame member 50 by welding along an outer edge 92 of the right-center engine support 62. The weld material is not shown in FIGS. 5-8. It should be appreciated that the left-center and right-center engine supports 60, 62 can also be coupled to their respective frame members 46, 50, using adhesives, brazing, fasteners, and other known coupling methods. Alternatively, the left-center and right-center engine supports 60, 62 may be integrally formed with their respective frame members 46, 50.

Each of the center engine supports 60, 62 is configured to fail in a predetermined manner so that the fuel-containing volume 78 is more likely to remain intact. In this way, the center engine supports 60, 62 define fracture control couplings between the engine assembly 18 and the frame 14. In the illustrated embodiment, each of the center engine supports 60, 62 defines a stress-riser 94 in the form of groove or channel that extends along inner surfaces 98 of each center engine support 60, 62 between the engine mount 86 and the respective one of the left and right frame members 46, 50. The stress-risers 94 each include an internal edge 102 that defines a corner for concentrating stress in a localized area of each center engine support 60, 62. The stress-risers 94 are provided so that if a force is applied to the engine mounts 86 (generally as a result of forces applied to the engine assembly 18), stresses in the respective engine support 60, 62 will be highest along the internal edge 102.

If the stresses are high enough to initiate failure (e.g. cracking) of one or both of the engine supports 60, 62, the failure will initiate at the internal edge 102 (where stresses are highest) and proceed at least partially through the engine support 60 and/or 62 between the engine mount 86 and the left or right frame member 46, 50. Upon such failure, a first portion 106 of each engine support 60, 62 will remain coupled to the left or right frame member 46, 50, and a second portion 110 of each engine support 60, 62, including the engine mount 86, will be at least partially separated from the first portion 106. By promoting failure by way of separation of the first and second portions 106, 110 from one another, the likelihood of damage to the left or right frame member 46, 50 is reduced, thereby increasing the likelihood that the fuel-containing volume 78 will remain intact.

Referring also to FIGS. 9-12, the rear engine supports 66, 70 are also configured to fail in a predetermined manner so that the fuel-containing volume 78 is more likely to remain intact. The rear engine supports 66, 70 therefore also define fracture control couplings between the engine assembly 18 and the frame. Unlike the center engine supports 60, 62 which are welded to their respective frame members 46, 50, the left-rear and right-rear engine supports 66, 70 are integrally formed (e.g. by casting) with their respective left and right frame members 46, 50. It should be appreciated however that the left-rear and right-rear engine supports 66, 70 could also be welded to their respective frame members 46, 50, or coupled to the frame members 46, 50 using any of the other coupling methods discussed above.

Each rear engine support 66, 70 includes a stress riser in the form of a relatively abrupt cross-sectional change that provides a stress focusing internal edge 114 defining a corner. A first portion 118 of each rear engine support 66, 70 is adjacent the respective left or right frame member 46, 50 and includes a first thickness T1. A second portion 122 of each rear engine support 66, 70, defines the engine mount 86 and includes a second thickness T2 that is less than the first thickness T1.

As discussed above with respect to the center engine supports 60, 62, when force is applied to the engine mounts 86 of the rear engine supports 66, 70, stresses in the engine supports 66, 70 are highest along the internal edges 114. If the resulting stresses are sufficient to initiate failure of one or both of the rear engine supports 66, 70, the failure causes the second portion 122 to at least partially separate from the first portion 118 while the first portion remains coupled to the left or right frame member 46, 50. By maintaining the integrity of the connection between the first portion 118 and the respective left or right frame member 46, 50, the fuel-containing volume 78 is more likely to remain intact.

Referring also to FIGS. 13 and 14, the left-front engine mount bracket 74 and the right-front engine mount bracket 76 each include a first end 126 that is coupled to the frame 14, and a second end 130. Mounting holes 134 are defined in the ends 126, 130 and receive fasteners (not shown) for coupling the ends 126, 130 to the front engine supports 54, 56 and the engine assembly 18, respectively (see FIGS. 1 and 2). The first end 126 of each bracket 74, 76 includes a mounting surface 138 that engages a respective one of the left-front and right-front engine supports 54, 56.

The engine mount brackets 74, 76 are configured similarly to the center and rear engine supports 60, 62, 66, 70 in that the engine mount brackets 74, 76 are also each provided with a stress riser 142 in the form of a stress focusing edge. The stress risers 142 are adjacent the first ends 126 of the engine mount brackets 74, 76 and, like the rear engine supports 66, 70, are at least partially defined by a relatively abrupt change in cross-section. The stress risers 142 concentrate the stress in a localized area so that upon application of sufficient force to the second end 130 of either of the engine mount brackets 74, 76, the first end 126, including the mounting surface 138, separates from the remainder of the engine mount bracket 74, 76 and remains coupled to the respective front engine support 54, 56. In this regard, the likelihood of damage to the frame 14 in the area of the front engine supports 54, 56 is reduced, and the fuel-containing volume 78 is therefore more likely to remain intact.

The invention claimed is:

1. A motorcycle frame for supporting a motorcycle engine, the motorcycle frame comprising:
   a frame member defining a fuel-containing volume;
   an engine support extending from the frame member;
   an engine mount defined by the engine support; and
   an internal edge defined by the engine support between the engine mount and the frame member, the internal edge defining a corner that extends along at least one side of the engine support, wherein a force applied to the engine mount having a magnitude sufficient to initiate failure along the internal edge, thereby at least partially separating the engine mount from the frame member, is insufficient to cause separation of the engine support from the frame member, thereby leaving the fuel-containing volume substantially intact.

2. The motorcycle frame of claim 1, wherein the internal edge substantially divides the engine support into a first portion that extends from the frame member and a second portion that defines the engine mount.

3. The motorcycle frame of claim 2, wherein the second portion at least partially separates from the first portion in response to application of the force to the engine mount.

4. The motorcycle frame of claim 1, wherein the engine support is integrally formed with the frame member.

5. The motorcycle frame of claim 1, wherein the engine support is coupled to the frame member by a weld, and wherein the internal edge is defined between the weld and the engine mount.

6. The motorcycle frame of claim 1, further comprising a fuel inlet fluidly communicating with a first end of the hollow frame member, and a fuel outlet fluidly communicating with a second end of the hollow frame member.

7. The motorcycle frame of claim 1, wherein the engine support comprises an engine support bracket having a first end coupled to the frame member and a second end that defines the engine mount.

8. The motorcycle frame of claim 1, wherein the frame member is hollow and defines a wall of the fuel-containing volume, and wherein the engine support extends from the wall opposite the fuel-containing volume.

9. The motorcycle frame of claim 1, wherein the engine is rigidly mounted to the frame.

10. A motorcycle frame for supporting a motorcycle engine, the motorcycle frame comprising:
    a steering head;
    a frame member coupled to the steering head, the frame member defining a fuel-containing volume; and
    an engine support depending from the frame member and defining a stress focusing edge that substantially divides the engine support into a first portion and a second portion, wherein a force applied to the second portion sufficient to at least partially separate the second portion from the first portion is insufficient to separate the first portion from the frame member, thereby leaving the frame member and fuel-containing volume substantially intact,
    wherein the second portion defines an engine mount adapted for coupling to the motorcycle engine, and wherein the engine support is coupled to the frame member by a weld, and wherein the stress focusing edge is defined between the weld and the engine mount.

11. The motorcycle frame of claim 10, wherein the engine mount rigidly couples the motorcycle engine to the frame member.

12. The motorcycle frame of claim 10, wherein the engine support is integrally formed with the frame member, and wherein the first portion includes a first thickness, the second portion includes a second thickness, and the first thickness is greater than the second thickness.

13. The motorcycle frame of claim 10, further comprising a second engine support depending from the frame member and defining a stress focusing edge that substantially divides the second engine support into a first portion and a second portion, wherein the first and second portions at least partially separate from one another in response to application of a second force to the second portion of the second engine support, and wherein the second force is insufficient to cause separation of the first portion of the second engine support from the frame member.

14. The motorcycle frame of claim 13, wherein the first engine support is integrally formed with the frame member, and wherein the second engine support is coupled to the frame member by a weld.

15. The motorcycle frame of claim 10, wherein the engine support comprises an engine support bracket having a first end coupled to the frame member and a second end that defines the engine mount.

16. The motorcycle frame of claim 10, wherein the frame member is hollow and defines a wall of the fuel-containing volume, and wherein the engine support extends from the wall opposite the fuel-containing volume.

17. A motorcycle comprising:
    a frame including a frame member that defines a fuel-containing volume;
    an engine; and
    a fracture control coupling for coupling the engine to the frame member, the fracture control coupling being configured to fail before failure of the frame member in response to application of a relative force between the engine and the frame, thereby leaving the fuel-containing volume substantially intact, wherein the fracture control coupling includes at least one of an internal edge, a corner, and an abrupt change of a cross-sectional area.

18. The motorcycle of claim 17, wherein the engine is rigidly coupled to the frame.

19. The motorcycle of claim 17, wherein the fracture control coupling includes a first portion coupled to the frame member and a second portion coupled to the engine, and wherein the fracture control coupling is configured to fail between the first and second portions in response to the relative force.

20. The motorcycle of claim 17, wherein the frame member defines a wall of the fuel-containing volume, and wherein the fracture control coupling is coupled to the wall opposite the fuel-containing volume.

21. The motorcycle of claim 20, wherein at least a portion of the fracture control coupling is welded to the wall.

22. The motorcycle of claim 20, wherein at least a portion of the fracture control coupling is integrally formed with the wall.

* * * * *